United States Patent Office 3,561,937
Patented Feb. 9, 1971

3,561,937
SHAPED POLYESTER HAVING INCREASED
ADHESION TO COATINGS
Richard A. Matthews, Roseville, Minn., assignor to Minnesota Mining and Manufacturing Company, St. Paul,
Minn., a corporation of Delaware
No Drawing. Filed Nov. 14, 1968, Ser. No. 775,929
Int. Cl. B29g 5/00; C08g 51/12
U.S. Cl. 51—298
4 Claims

ABSTRACT OF THE DISCLOSURE

Tensilized shaped polyester strips, such as fibers or films, having increased receptivity to adhesion by resinous materials. The improved receptivity results from immersing a hot amorphous strip in a quench solution of isocyanate dissolved in and reacted with a stoichiometric excess of at least one monohydric alcohol, rinsing the strip to remove excess quench solution from the surface, and thereafter tensilizing the strip. Fibers treated in this manner are especially useful in the manufacture of lofty open low density nonwoven fibrous abrasive products.

BACKGROUND OF THE INVENTION

This invention relates to novel tensilized shaped polyester strips, such as fibers or films, having excellent receptivity to adhesion by resinous materials.

Tensilized polyester fibers and films have found widespread industrial acceptance because of their high modulus, high tensile strength, chemical inertness, low water absorption, high melting temperature and comparatively low cost. Despite these striking advantages, tensilized polyester structures are notoriously unreceptive to many adhesives and coatings, particularly when the adhesive or coating is relatively rigid, as is the case with phenolic resins.

A specific application where inability to secure adequate adhesion to tensilized polyester fibers has proved troublesome, lies in the manufacture of lofty open nonwoven low density fibrous abrasive articles of the type described and claimed in U.S. Pat. 2,958,593, the disclosure of which is incorporated herein by reference. Although inherently attractive for use in such abrasive articles, tensilized polyester fibers have proved workable but less successful than had been anticipated. This has been traced to the comparatively low adhesion of the resins used to bind the fibers together at points where they cross and intersect and to bind abrasive grains to the fibers.

One way in which the receptivity of a polyester fiber to phenolic resin can be determined is the "drop test." In this test a droplet of alkali-catalyzed resole-type phenolformaldehyde resin is placed on a fiber, surface tension tending to form the droplet into a sphere with the fiber passing through the center. The amount of resin selected for this test is such that the diameter of the droplet is substantially 4 times the diameter of the fiber. The resin is then cured, after which the fiber is passed through a plate having a small hole slightly larger than the fiber until the cured phenolic resin bead seats against the portion of the plate surrounding the hole. The plate is then clamped in one jaw of a tensile testing machine and the end of the fiber clamped in the other jaw. The jaws are then separated at a rate of 1 inch per minute until the fiber either breaks or pulls through the phenolic resin bead.

The force required to cause failure is a measure of the resin adhesion to the fiber and is typically expressed in grams per denier; conventional 50-denier polyester fiber requires on the order of 75 gms. or less to fail the "drop test," failure uniformly occurring by slipping of the bead.

The art discloses many methods of priming shaped polyester strips to improve the receptivity to various resins. For example, U.S. Pats. No. 2,862,281 and 3,234,067 suggest treating polyester tire cords with blocked isocyanates or urethane-polyepoxide solutions to improve the adhesion of rubber thereto. Other priming methods include etching with acids or solvents. To the best of my knowledge and belief, all such techniques either are ineffective in improving the adhesion of relatively stiff coating materials or else weaken the fibers so that they are ineffective.

SUMMARY

This invention provides novel tensilized shaped polyester strips having not only high modulus, high tensile strength, low water absorption, chemical inertness, high melting temperature, and low cost, but also excellent receptivity to adhesion by relatively rigid resinous materials. Further, the invention provides polyester fibers ideally suited for use in the manufacture of lofty nonwoven open low density fibrous abrasive articles and other industrial products, such as fabrics and tire cords.

The shaped strips of this invention are conveniently obtained by immersing a hot amorphous unoriented polyester strip, such as a fiber or film, in a quench solution comprising isocyanate dissolved in and reacted with a stoichiometric excess of at least one liquid monohydric alcohol, rinsing the strip in a liquid which is compatible with the quench solution to remove excess quench solution from the surface, and tensilizing the strip. It is thought that a reaction occurs between the isocyanate solute and the alcohol solvent to provide a urethane dissolved in alcohol solvent. Infrared analysis indicates that no isocyanate is present in either freshly prepared or aged samples of quench solution.

In accordance with the invention, a tensilized strip is provided which has a tensilized polyester core substantially surrounded by a urethane sheath. The strip has a tensile strength of about 17,500 to 140,000 p.s.i. and an elongation of about 10 to 200%. Phenolic resin requires on the order of 100 gms. or more to fail the previously described "drop test" on a 50 denier fiber.

It has been found that polyester resins having an intrinsic viscosity greater than 0.5 may be utilized to prepare the shaped strips of this invention. Examples of liquid monohydric alcohols that may be used as quench solution solvents are propyl alcohol, butyl alcohol, isopropyl alcohol, and ethylene glycol monoethyl ether.

The isocyanates which are dissolved in the alcohol quench solution and with which the alcohol reacts to form urethanes, may be monoisocyanates, diisocyanates, and polyisocyanates, or combinations thereof. It has been found that a stoichiometric excess of liquid monohydric alcohol is necessary, about 1.25 to 25% by weight of isocyanate in the liquid alcohol quench solution being operable. About 1.5 to 10% isocyanate in alcohol is preferred, about 2.5 to 5% being most preferred. Isocyanate concentrations less than 1.25% generally do not produce the increased receptivity to adhesion by resinous materials. Stirring is often necessary to dissolve the isocyanate in the alcohol, an exothermic reaction usually occurring.

When extruding shaped polyester strips at a rate of 50 feet per minute, the extruder die is preferably at a distance of about ½ inch to 3 inches from the quench solution surface. A faster rate of extrusion permits placing the quench solution further from the die. Conversely, slower rates of extrusion require that the die be closer to the quench solution, which is advantageously maintained at about 70–80° F.

Following the quench treatment, the strips are rinsed by passing through an inclined trough flooded with liquid at 140° F., to remove excess quench solution, the rinse liquid being compatible with the quench solution. While a 140° F., rinse temperature is preferred, substantial temperature variation is possible without severely affecting the quality of the shaped strip. Subsequent to rinsing, the strips are heated by means of hot water, hot air, heated oven, or platens, etc., and then tensilized, the desired amount of tensilization being dependent upon the particular end use of the strip. Fibers are typically tensilized about 3× to 8× and films about 2× to 3×. After cooling, the tensilized strip is ready for crimping if desired, and for use in making various bonded articles.

The excellent adhesion of resinous materials to the aforedescribed strips is readily determined in the laboratory by the previously described "drop test," or by testing a final product made with the fiber or film. Other physical properties of the strip are readily obtained in a standard manner. For example, tensile strength and elongation are determined by means of a tensile tester (ASTM Test D–540), while the secant modulus at 5% strain is determined from the tensile and elongation (ASTM Test D–888–36).

The following examples, in which all parts are by weight unless otherwise noted, illustrate preparation of the shaped articles of this invention, without limiting the scope thereof.

DESCRIPTION OF THE PREFERRED EMBODIMENTS

Examples 1–4

These examples illustrate preparation of polymeric fibers having excellent adhesion to phenolic resin, Examples 1–4 illustrating use of varying amounts of isocyanate in the alcohol quench solution. Two controls were also prepared, one having a water quench solution and the other having a quench solution not containing any isocyanate.

Polyethylene terephthalate resin having an intrinsic viscosity of 0.65, previously dried in a vacuum oven for 4 hours at 250° F. was extruded by means of a 20:1 $L/D$, ¾-inch extruder having a metering pump attached to the screw. A 60-filament tow of fibers was metered from the extruder at a 30-gram per minute rate through 0.042 inch die openings (1:1 $L/D$ ratio). The fiber tow was pulled through the quench solution by means of a takeup station running at 50 lineal feet per minute. The surface of the quench solution was 2 inches below the die face and the fiber tow was immersed in the quench solution for a distance of 14 inches, the quench solution being maintained at 75±5° F., by means of a recirculating pump and reservoir.

Four lots of fibers were made utilizing quench solutions comprising varying amounts of polymethylene polyphenyl isocyanate in ethylene glycol monoethyl ether (ethyl "Cellosolve") as illustrated in Table I. Residual quench solution was rinsed from the fiber tow in an inclined trough flooded with 140° F. water, the fibers subsequently being tensilized by passing the tow through 190° F. water and stretching the fiber 4× while hot and then passing the fiber tow over a heated platen (250° F.) and stretching it 2×, to provide 50-denier fibers.

Adhesion of phenolic resin to the fibers was determined by placing a bead of alkaline catalyzed resolephenolic resin having a diameter approximately 4× the fiber diameter on the central portion of a length of single fiber, and curing for 60 minutes at 225° F. After cooling, the fibers were tested by the "drop test" previously described. Ten specimens were prepared and tested for each example, fiber breakage occurring in all instances of treated fibers. The force, in grams per denier, at which the fibers broke, together with the type of failure are recorded in Table I. Tensile strength and elongation (ASTM Test D–540), and secant modulus (ASTM Test D–885–36) of the fibers were determined and are reported in Table I. In some instances, the "drop" strength was greater than the fiber tensile strength because the fibers often become stronger when the phenolic bead is cured at elevated temperatures.

The surface absorption spectrum of the fibers was determined by multiple internal reflection infrared analysis on a Perkin-Elmer Model 21A infrared spectrophotometer fitted with a double beam multiple internal reflection attachment (Wilkes Scientific Corporation). The spectrum exhibited an absorption peak at about 6.5 microns indicative of N–H deformation which is characteristic of urethanes and a peak at about 13.7 microns indicative of terephthalate ester which is characteristic of polyethylene terephthalate. The fiber exterior was extracted for 48 hours with warm methanol (65° F.), the dried methanol extract exhibiting infrared absorption peaks at about 6.5 microns and at about 13.7 microns, again being indicative of urethane and polyethylene terephthalate.

A portion of the tow of Example 3, prepared as described above, was crimped and cut to approximately 2-inch length. Following the general procedure outlined in U.S. Pat. 2,958,593 a lofty open low density fibrous abrasive web, about ½ inch thick and weighing approximately 42 grams per 24 square inches, was then formed from the fibers. A slurry comprising 353 parts of 81% nonvolatile thermosetting phenol-formaldehyde resin, 94 parts of polyamide resin, 210 parts of ethylene glycol monoethylether, and 754 parts of grade 280–600 aluminum oxide was applied by a roll coater, and the resin cured in a 2-zone tunnel oven at 295° F. and 330° F. The thickness of the final product remained approximately ½".

Eighteen-inch diameter discs were cut from the nonwoven abrasive web described in the preceding paragraph and subjected to testing on conventional floor surfacing machines. The discs were found to retain their loft and to clean and polish the floor in both wet and dry conditions. Products prepared in the same manner, using the same slurry but conventional polyester fibers, fail to retain their loft when subjected to this type of use.

Example 5

This example illustrates use of isopropyl alcohol as the quench solution solvent. The experimental procedure described in Examples 1–4 was followed in preparing the fiber tow, except that isopropyl alcohol was substituted for the ethylene glycol monoethyl ether. The phenolic drop strength and type of failure (fiber break or drop slippage) was determined in the manner of Examples 1–4 and are illustrated in Table I. Phenolic resin exhibited excellent adhesion to fibers prepared in this manner.

Examples 6–10

These examples illustrate use of various isocyanates as the solute dissolved in the alcohol quench solution. The various isocyanates utilized are illustrated in Table I, the procedure of Examples 1–4 being utilized to prepare the fibers. Phenolic drop strength, type of fiber failure, tensile strength, elongation, and secant modulus, were determined in the manner of Examples 1–4 and are illustrated in Table I. Phenolic resin exhibited excellent adhesion to fibers prepared in this manner. The infrared absorption of the fibers and of the methanol extract of the fibers was obtained in the manner of Examples 1–4 and exhibited the same absorption spectra except for Example 10 which did not exhibit an absorption peak at about 6.5 microns.

Examples 11–13

These examples illustrate preparation of tensilized films in accordance with the invention, and the testing thereof. A slot die having dimensions of 1.25" x 0.012" x 0.375" was installed on the extruder of Example 1. A 2-inch diameter casting roll was installed about 0.1 in. below the die and partially immersed in the quench solution of Example 2, the quench solution temperature being 90° F. The extruded film (6–8 mils) was pulled through the quench solution (14 inches), and rinse water trough (140° F.) at a rate of 30 feet per minute. The film was then passed through a 190° F. water bath and stretched 4× lengthwise, followed by a 12.5% stretch over a 250° F. platen, providing a 3–5 mil tensilized film. A control was also made using water at 70° F., as the quench solution.

Adhesion to the isocyanate-alcohol treated film was determined and compared with the adhesion to the control. The treated films and the controls were separately bonded with a urethane adhesive (EC–4475, Minnesota Mining and Manufacturing Company), a vinyl adhesive (EC–2262, Minnesota Mining and Manufacturing Company), and a nitrile adhesive (EC–1099, Minnesota Mining and Manufacturing Company). The bonding was done by coating strips of each film with each adhesive by means of a brush, leaving the coated films to dry for 10 minutes, placing the films together in a face to face manner so that the adhesive surfaces touch, bonding the strips of film by rolling them with a 2-inch rubber roller using hand pressure, and ageing the bonds for one week at 75° F. The bonds were tested by placing the two adjacent ends of the film strips of a bond in the jaws of a tensile tester and pulling the bond apart in T peel at a rate of 0.2"/minute. The test data are reported in Table II, the treated polyester film exhibiting greater adhesion than the untreated film.

TABLE II

| | Quench solution | Adhesive | Bond strength, lbs./in. |
|---|---|---|---|
| Example: | | | |
| 11 | Example 2 | Urethane | 1.6 |
| Control | Water | do | 1.4 |
| 12 | Example 2 | Vinyl | 1.4 |
| Control | Water | do | 0.6 |
| 13 | Example 2 | Nitrile | 2.6 |
| Control | Water | do | 2.0 |

I claim:
1. A lofty open nonwoven low density fibrous abrasive product made from the fibers made by the process of claim 3.
2. A tensilized fiber made by the process of claim 3.
3. A process of making a tensilized shaped polyester strip, such as film or fiber, having increased receptivity to adhesion by resinous materials, said process comprising the steps of:
   immersing a hot amorphous polyester strip in a quench solution of isocyanate dissolved in and reacted with a stoichiometric excess of at least one liquid monohydric alcohol,
   rinsing the quenched strip in a liquid which is compatible with the quench solution to remove excess quench solution from the surface of the strip, and
   tensilizing the quenched and rinsed strip.
4. The process of claim 1 wherein the hot amorphous polyester strip is extruded immediately prior to immersion in the quench solution.

(References on following page)

---

TABLE I

| Example: | Quench solvent | Isocyanate | Percent Isocyanate | Phenolic drop strength, grams/denier | Type of failure | Tensile, grams/denier | Elongation, percent | Modulus, grams/denier |
|---|---|---|---|---|---|---|---|---|
| Control | Water | | | 1.51 | Drop | 3.41 | 40 | 44.4 |
| Control | Ethylene glycol monoethylether | | | 1.21 | do | 3.87 | 25 | 65.5 |
| 1 | do | Polymethylene polyphenylisocyanate [1] | 2.5 | 2.27 | Fiber | 1.98 | 67 | 32.3 |
| 2 | do | do | 5 | 2.42 | do | 1.96 | 56 | 37.2 |
| 3 | do | do | 7.5 | 3.46 | do | | | |
| 4 | do | do | 10 | 3.42 | do | 3.93 | 63 | 41.8 |
| 5 | Isopropyl alcohol | do | 5 | 3.3 | Drop | | | |
| 6 | 75 parts [2] | Triphenylmethane triisocyanate [3] | 5 | 3.2 | Fiber, 10% | 3.6 | 53 | 41 |
| 7 | Ethylene glycol monoethylether | 75% solution of the reaction product [4] | 2.5 | 2.2 | Fiber, 90% | 4.0 | 54 | 48 |
| 8 | do | (poly) diphenyl-methane diisocyanate [5] | 5 | 2.6 | Fiber | 4.1 | 65 | 51 |
| 9 | do | do | 5 | 1.85 | Fiber, 40% | 2.7 | 67 | 40 |
| 10 | do | Phenyl isocyanate | | | | | | |

[1] PAPI, Carwin Company.  [2] Ethylene glycol monoethylether and 20 parts methylene chloride.  [3] "Mondur" TM, Mobay Chemical Company.  [4] Toluene diisocyanate and trimethanol propane in ethyl acetate, "Mondur" CB-75, Mobay Chemical Company.  [5] "Mondur" MR, Mobay Chemical Company.

References Cited

UNITED STATES PATENTS

| | | | |
|---|---|---|---|
| 2,324,397 | 7/1943 | Hull | 264—176 |
| 2,844,488 | 7/1958 | Meherg et al. | 117—7 |
| 3,002,804 | 10/1961 | Kilian | 264—161X |
| 3,090,716 | 5/1963 | Stevens | 154—52.1 |
| 3,117,173 | 1/1964 | Adams I | 264—290X |
| 3,155,754 | 11/1964 | Adams II | 264—347X |
| 3,233,019 | 2/1966 | Adams III | 264—78 |
| 3,215,486 | 11/1965 | Hada et al. | 264—210F |
| 3,225,094 | 12/1965 | Wolf | 260—570 |
| 3,446,886 | 5/1969 | Karickhoff | 264—78X |

JAY H. WOO, Primary Examiner

U.S. Cl. X.R.

51—296; 57—164; 117—7, 138.5; 161—175; 264—136, 178, 210, 290